United States Patent
Siegel et al.

(10) Patent No.: US 6,168,245 B1
(45) Date of Patent: Jan. 2, 2001

(54) HYDRAULIC BRAKE SYSTEM FOR MOTOR VEHICLES

(75) Inventors: Heinz Siegel, Stuttgart; Arnold Pahl, Markgroeningen; Rolf Hummel, Steinenbronn; Guenter Krenz, Steinheim; Erika Mank, Ludwigsburg; Rolf Stotz, Vaihingen, all of (DE)

(73) Assignee: Robert Bosch GmbH, Stuttgart (DE)

( * ) Notice: Under 35 U.S.C. 154(b), the term of this patent shall be extended for 0 days.

(21) Appl. No.: 09/077,802

(22) PCT Filed: Jul. 25, 1996

(86) PCT No.: PCT/DE96/01374

§ 371 Date: Nov. 13, 1998

§ 102(e) Date: Nov. 13, 1998

(87) PCT Pub. No.: WO97/21571

PCT Pub. Date: Jun. 19, 1997

(30) Foreign Application Priority Data

Dec. 14, 1995 (DE) ............................................ 195 46 682

(51) Int. Cl.[7] .................................................... B60T 8/42
(52) U.S. Cl. .......................................... 303/115.4; 303/10
(58) Field of Search .............................. 303/113.2, 113.3, 303/10, 11, 116.4, 115.4; 417/310, 440, 307; 418/61.1, 61.3

(56) References Cited

U.S. PATENT DOCUMENTS

| 5,017,101 | * | 5/1991 | White ................................. 417/310 |
| 5,401,083 | * | 3/1995 | Altmann et al. ................... 303/113.2 |
| 5,501,514 | * | 3/1996 | Resch et al. ....................... 303/115.4 |
| 5,927,824 | * | 7/1999 | Pahl et al. ......................... 303/113.2 |
| 5,947,567 | * | 9/1999 | Jonner et al. ...................... 303/115.4 |

FOREIGN PATENT DOCUMENTS 42 26 646 * 2/1994 (DE) .

* cited by examiner

*Primary Examiner*—Michael Mar
*Assistant Examiner*—Melanie Talavera
(74) *Attorney, Agent, or Firm*—Robert E. Greigg; Edwin E. Greigg

(57) ABSTRACT

The brake system has at least one brake circuit (I), in which a high-pressure pump is disposed. A self-aspirating charge pump is also provided, which is connected at least indirectly to the intake side of the high-pressure pump by an intake line of a supply container for brake fluid and by a pressure line. In the event of an inadequate supply of brake fluid by the charge pump, the pumping of air into the brake circuit (I) is intended to be precluded. To that end, a siphon is disposed in the intake line of the charge pump. Air aspirated by the siphon suddenly prevents pumping by the charge pump. The brake system is intended for use in motor vehicles with slip control or for automatic brakes.

3 Claims, 2 Drawing Sheets

HYDRAULIC BRAKE SYSTEM FOR MOTOR VEHICLES

PRIOR ART

The invention is based on a brake system for motor vehicles.

One such brake system has been proposed in German Patent Disclosure 196 19 985 A1, published on May 28, 1997, after the priority filing date of the present application; in this reference, the self-aspirating charge pump, for instance in the event of traction control, supplies the high-pressure pump with brake fluid from the brake fluid supply container of a master cylinder, so that the brake fluid can generate brake pressure for pumping to the wheel brake in accelerated fashion.

A hydraulic brake system of this generic type is also known from European Patent Disclosure EP 0 482 367 A1; it has a charge pump with which, in traction control, brake fluid from a supply container of a master cylinder can be pumped both to the intake side of a high-pressure pump and directly into a brake line to which wheel brakes are connected. In such a brake system, it must be assured that no air will enter the system along the way via the charge pump. This could happen from an inadequate filling of the brake fluid supply container, or if the intake line is severed, not mounted, or comes loose.

In a self-aspirating hydropump with a defective intake line, it is therefore known from German Patent Disclosure DE 40 11 668 Al for a short-circuit connection between the suction chamber and the pressure chamber of the pump to be broken. In this defective state, the pump is incapable of building up pressure, so that no air can be fed into the system.

ADVANTAGES OF THE INVENTION

The brake system according to the invention has the advantage over the prior art that in the event of a defect, pumping of air through the charge pump into the system is avoided even if the intake line is properly connected to the charge pump. That is, as soon as the liquid level in the intake line reaches the siphon, su(h a large quantity of air is aspirated by the charge pump that this abruptly ceases any further pumping.

By the provisions recited herein advantageous refinements of and improvements to the brake system.

Thus the advantageous characteristic defined can be attained in a simple way by suitably laying the intake line, or by means of a hose shaped according to the invention or a bentor curved tube.

The advantageous feature of the invention disclosed moreover provides freedom from the aforementioned mounting requirements for the intake line, because the siphon is embodied entirely directly on the pump, in the housing thereof.

BRIEF DESCRIPTION OF THE DRAWINGS

Two exemplary embodiments of the invention are shown in simplified form in the drawing and described in further detail in the ensuing description.

DESCRIPTION OF THE EXEMPLARY EMBODIMENTS

Figure 1:
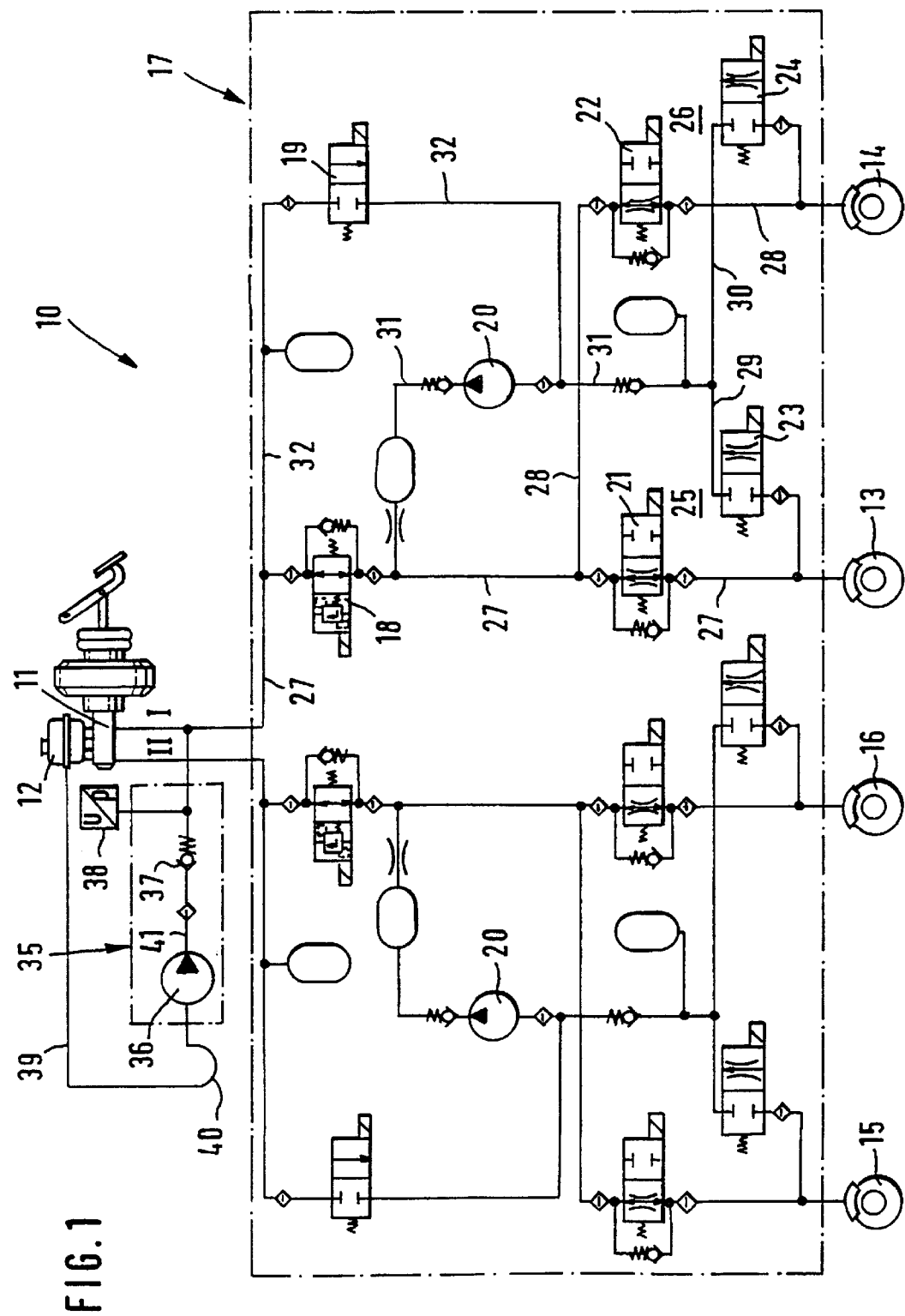
FIG. 1 shows a circuit diagram of the brake system with a siphon in the intake line of a charge pump, as the first exemplary embodiment.

A hydraulic brake system 10 for motor vehicles, schematically shown in FIG. 1, has a dual-circuit, pedal-actuatable master cylinder 11 with a supply container 12 for brake fluid. A first brake circuit I assigned to the wheel brakes 13, 14 of a front axle of the vehicle is connected to the master cylinder 11; a second brake circuit II of the master cylinder 11 communicates with wheel brakes 15, 16 of the rear axle of the vehicle. Elements of the brake system 10, which in accordance with the circuit diagram shown in FIG. 1 are disposed between the master cylinder 11 and the wheel brakes 13–16 in the brake circuits I and II, are combined in a hydraulic unit 17.

As will be described below in terms of brake circuit I, these elements include a shutoff valve 18 with a pressure limiting function; a charge valve 19; a high-pressure pump 20; and pressure buildup valves 21, 22 and pressure reduction valves 23, 24 of pressure modulating devices 25 and 26 that are assigned to the wheel brakes 13 and 14. While the shutoff valve 18 and the pressure buildup valves 21 and 22 are located in brake lines 27 and 28 that lead from the master cylinder 11 to the wheel brakes 13 and 14, the pressure reduction valves 23 and 24 are disposed in line branches 29 and 30 of a return line 31, in which the high-pressure pump 20 is provided. The line branches 29 and 30 lead away from the brake lines 27 and 28 between the pressure buildup valves 21 and 22 and the wheel brakes 13 and 14; conversely, on the outlet side of the high-pressure pump 20, the return line 31 is connected to the brake line 27 between the shutoff valve 18 and the two pressure buildup valves 21 and 22. The charge valve 19 is located in a charge line 32, which leads away from the brake line 27 between the master cylinder 11 and the shutoff valve 18 and discharges into the return line 31 on the intake side of the high-pressure pump 20. The brake circuit II is equipped correspondingly.

The brake system 10 also includes a charge unit 35, which comprises a charge pump 36, a check valve 37, and a pressure sensor 38. The charge pump 36 is connected by an intake line 39 to the brake fluid supply container 12 of the master cylinder 11. The intake line 39 is embodied as a hose or tube that is resistant to brake fluid. A siphon 40 is located in the intake line 39 on the inlet side of the charge pump 36. As shown in the first example in FIG. 1, this siphon is embodied outside the charge unit 35 in the intake line 39. A pressure line 41 extends from the charge pump 36 and is connected to the brake line 27 between the master cylinder 11 and the shutoff valve 18 of brake circuit I. The check valve 37 is located in the pressure line. If the brake system 10 is to be equipped for automatic brakes for the sake of stabilizing the vehicle during cornering, then further sensors, such as steering wheel angle sensors, yaw speed sensors and transverse acceleration sensors, are a part of the equipment of the brake system 10 as well.

The foregoing relates to a preferred exemplary embodiment of the invention, it being understood that other variants and embodiments thereof are possible within the spirit and scope of the invention, the latter being defined by the appended claims.

The mode of operation of such a brake system 10 is described in German Patent Application 196 19 985 A1 mentioned at the outset.

Both the high-pressure pumps 20 assigned to the two brake circuits I and II, and the charge pump 36 can be driven by an electric motor. The high-pressure pumps 20 are reciprocating piston pumps; conversely, the charge pump 36 is a self-aspirating recirculating positive displacement pump, for instance a toothed ring pump known by the tradename "GEROTOR". While the charge pump 36 is capable of generating only relatively slight pressures, the high-pressure pumps 20 are designed to furnish pressures up to approximately 200 bar. The purpose of the charge pump 36 is, in the event of traction control and in automatic braking, to supply the high-pressure pumps 20 with brake fluid faster, in order to shorten the response time of the brake system 10, especially if the brake fluid has a higher viscosity at low ambient temperatures than when the vehicle is at operating temperature. To that end, the charge pump 36 aspirates brake fluid from the supply container 12 and pumps it into the brake circuit I, which can be actuated by the rod piston of the master cylinder 11. Internal resistances of the master cylinder 11 prevent the charge pressure of the charge pump 36 from decreasing toward the supply container 12; instead, by displacement of brake fluid through the charge line 32 to the intake side of the high-pressure pump 20, the charge pressure becomes operative. Because of the dividing piston located between the brake circuits I and II in the master cylinder 11, the charge pressure likewise becomes operative in the brake circuit II and supplies the high-pressure pump 20 there with brake fluid in an equally accelerated manner.

As a result of inadequate maintenance of the brake system 10, that is, a lack of brake fluid in the supply container 12 or a lack in the intake line 39, there is the risk that air will enter the brake circuit I during the above-described mode of operation. It has now been found that according to the invention this is prevented by disposing the siphon 40 in the intake line 39. That is, if the brake fluid level in the intake line 39 reaches the bend of the siphon 40, then the charge pump 36 aspirates such a large quantity of air that this air abruptly discontinues further pumping by the charge pump 36. Air can therefore not reach the brake line 27 of brake circuit I.

Figure 2:
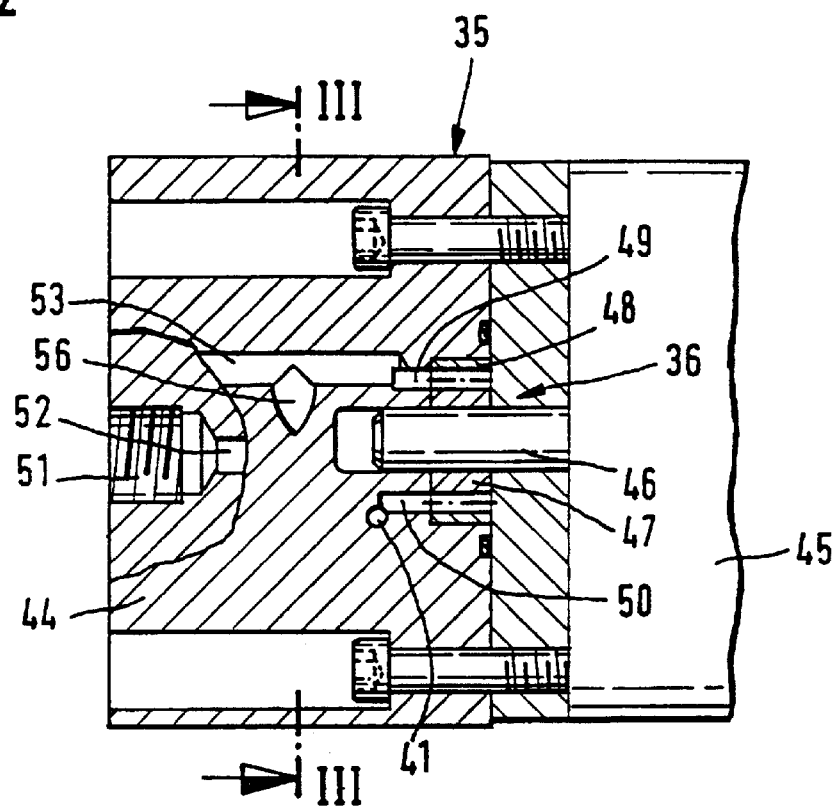
FIG. 2 is a longitudinal section through a charge pump with a siphon embodied in its housing, as the second exemplary embodiment.
Figure 3:
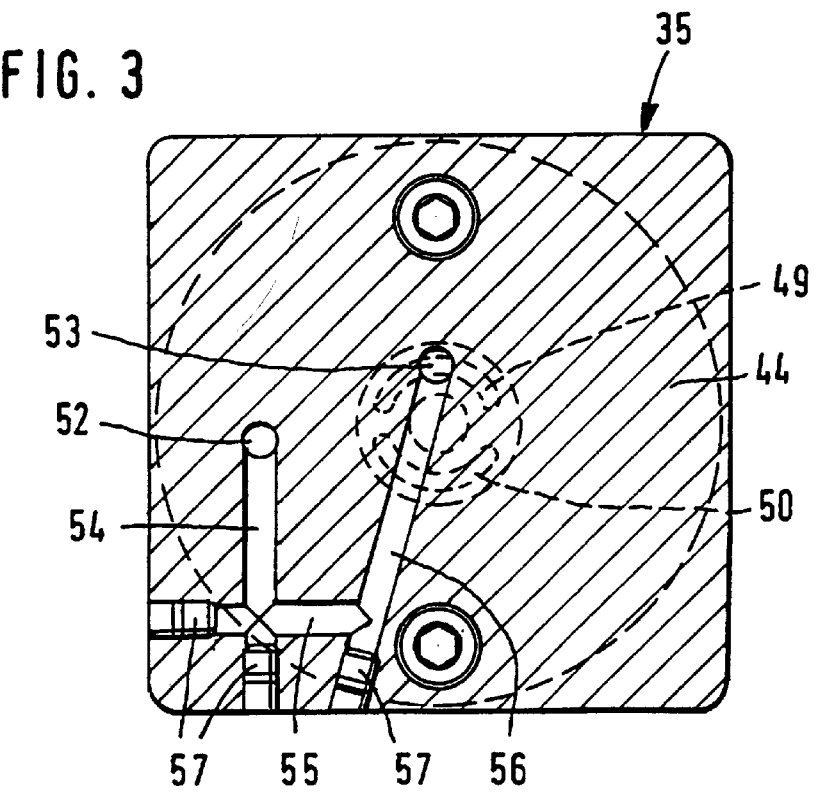
FIG. 3 is a section through the housing of the charge pump, taken along the line III—III of FIG. 2.

In the second exemplary embodiment shown in FIGS. 2 and 3, the invention is realized inside the charge unit 35. The charge unit has a housing 44 with a drive motor 45 of the charge pump 36 flanged to it. A motor shaft 46 that engages the housing 44 carries a gear wheel 47 with teeth on the outside that meshes with a gear ring 48 with teeth on the inside. Two crescent-shaped recesses 49 and 50 in the housing 44 are associated with the charge pump 36; of these, one recess 49 is disposed on the intake side of the pump, and the other recess 50 is disposed on the compression side of the pump. In addition, the housing 44 is provided with a connection stub 51 for the portion of the intake line 39 extending outside the charge unit 35. Leading away from the connection stub 51 is a blind bore 52 extending with a parallel axis to the motor shaft 46. Likewise extending parallel to the motor shaft 46, a bore 53 is provided, which discharges into the intake-side recess 49 of the charge pump 36. Three bores 54, 55 and 56 are also provided, which as FIG. 3 clearly shows extend approximately in a U to one another and mutually connect the first two bores 52 and 53 to one another. Toward the outside, the bores 53, 54, 55 and 56 are tightly closed off by closure elements 57.

In the position for use of the charge unit 35, the bores 54, 55 and 56 form the siphon 40, which is located in the course cf the intake line 39 between the brake fluid supply container 12 and the charge pump 36.

The pressure line 41 is connected to the compression-side recess 50. For the sake of simplicity, the further course of the pressure line 41 in the housing 44 of the charge pump 36 is not shown.

We claim:

1. A hydraulic brake system (10) for motor vehicles, having at least one brake circuit (I), in which a high-pressure pump (20) is disposed, a self-aspirating charge pump (36), which in a position for use is located below a supply container (12) for brake fluid and is connected by an intake line (39) to the supply container (12) for brake fluid and by a pressure line (41) at least indirectly to the intake side of the high-pressure pump (20), and a siphon (40) is disposed in the intake line (39) of the charge pump (36) is embodied as a tube.

2. A hydraulic brake system (10) for motor vehicles, having at least one brake circuit (I), in which a high-pressure pump (20) is disposed, a self-aspirating charge pump (36), which in a position for use is located below a supply container (12) for brake fluid and is connected by an intake line (39) to the supply container (12) for brake fluid and by a pressure line (41) at least indirectly to the intake side of the high-pressure pump (20), and a siphon (40) which is embodied by means of bores (54, 55, 56) in a housing (44) of the charge pump (36).

3. A hydraulic brake system (10) for motor vehicles, having at least one brake circuit (I), in which a high-pressure pump (20) is disposed, a self-aspirating charge pump (36), which in a position for use is located below a supply container (12) for brake fluid and is connected by an intake line (39) to the supply container (12) for brake fluid and by a pressure line (41) at least indirectly to the intake side of the high-pressure pump (20), and a siphon (40) is disposed in the intake line (39) of the charge pump (36) embodied as a hose.

* * * * *